Oct. 19, 1954

P. M. GRANDADAM 2,692,178

METHOD AND MATERIAL FOR GRAPHICAL
REGISTERING OR DIRECT RECORDING
Filed April 20, 1949

INVENTOR
PIERRE M. GRANDADAM

By Frederick E. Hane
ATTORNEY

Patented Oct. 19, 1954

2,692,178

UNITED STATES PATENT OFFICE 2,692,178

METHOD AND MATERIAL FOR GRAPHICAL REGISTERING OR DIRECT RECORDING

Pierre M. Grandadam, Paris, France, assignor to Office National d'Etudes et de Recherches Aeronautiques, Paris, France Application April 20, 1949, Serial No. 88,564

Claims priority, application France April 30, 1948

8 Claims. (Cl. 346—74)

This invention relates to systems using radiation beams for transmitting and recording motions of parts of measuring apparatus or the like and particularly to graphical registering of variable quantities or phenomena and at recording graphs or images. The invention also relates to methods of recording variable physical magnitudes.

In these systems, there is usually used as recording receivers photo-sensitive materials which are carried on moving or stationary plates, films or papers. In most cases, these photo-sensitive materials must be protected against light during the manipulation effected before or after registering or recording, since they are sensitive to ordinary light which will fog them; moreover, after registering or recording, the operator can see the graph or image only after a suitable chemical treatment has been applied. These requirements result in many drawbacks, among which the following may be mentioned:

The obligation of effecting the loading of the light-tight magazines in a dark room provided with a special lighting;

The necessity of using special light-tight spools when a daylight loading is to be effected;

Each apparatus must include a light-tight compartment;

During the whole time of the registering operation, the operator remains unaware of the registered information, unless elaborate equipments are incorporated with the apparatus, such as semi-silvered glass leaves, fixed mirrors, rotary mirrors, fixed or rotary monochromatic screens, fluorescent screens, etc.

After registering or recording, it is necessary to resort to a developing chemical treatment followed by washing and drying steps, for which a suitable equipment which is comparatively heavy and cumbersome should be provided;

Generally speaking, the registering or recording methods making use of radiations are time consuming and comparatively delicate to perform and introduce sources of error; in certain cases, their use is impossible due to the conditions which must be maintained.

This invention has for its object a means for graphical registering or recording which permits to take fully advantage of the properties for the sake of which the apparatus using radiation beams have been adopted. The invention which, in particular, avoids the drawbacks above-mentioned offers, inter alia, the following advantages:

Daylight loading of the magazines may be effected in any place and without taking any special precautions.

The carriers of the sensitive materials such as plates, films, papers, may be directly handled.

It is no longer necessary to provide the apparatus with a radiation-tight compartment or casing.

The method permits the operator to obtain a direct and immediate view of the registration or record without employing any special device for this purpose.

The said invention avoids the necessity of a chemical treatment;

It has the same advantages as the known means as to the utilization and the storage of the recordings.

The means according to the invention is characterized by the following features, taken separately or in combination:

(1) The use of a source of radiation such that it stimulates a maximum photo-conductivity of the receiving carrier at the impact points of the radiations thereon;

(2) The disintegration of the material at the photo-conductive impact points results from a dielectric break down caused by an electric potential traversing the recording material generated between two electrodes which may or may not be in contact with the recording material;

(3) The dielectric break down at the irradiated points of the recording material is obtained by the local variation in the resistivity at these points due to the photo-conductive effect frequently inherent with phosphorescence;

(4) According to an alternative embodiment the stimulation of the maximum photo-conductivity takes place at all points of the receiving carrier and the disintegration of the material is caused by a current flowing through the impact points of pointed electrodes brought to the suitable potential;

(5) According to another alternative embodiment, the arrangement of the material structure is varied by a current flowing through the receiving carrier at the photo-conductive spots, without any dielectric break down.

The following description is given as an illustration with reference to the diagrammatic accompanying drawing, in which.

Figure 1:
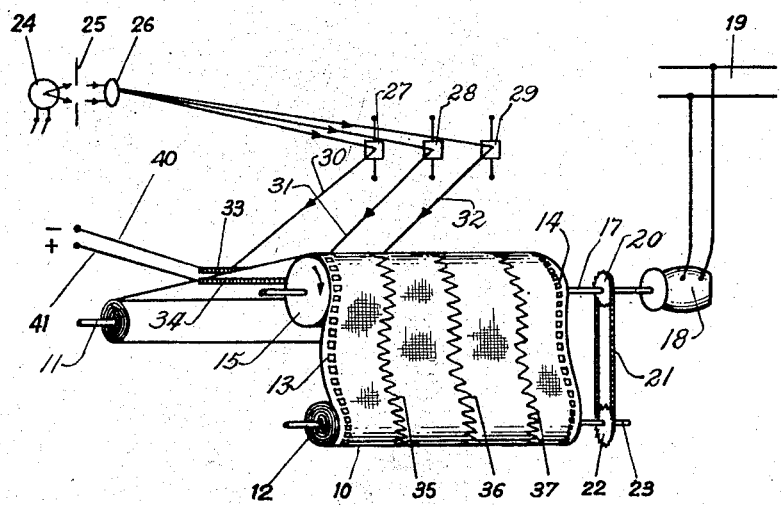
Fig. 1 is a general perspective view.
Figure 2:
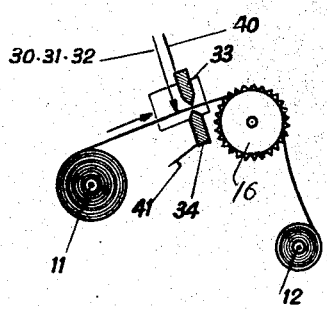
Fig. 2 is a corresponding sectional view.

The photo-conductive receiver 10 according to the invention, the composition of which will be more precisely described hereafter, is in the described embodiment, in the form of a film. It is payed out by a supply reel 11 and wound upon a reel 12. It runs over a suitable driving device shown as comprising sprocket wheels 15 and 16 co-operating with two series of perforations 13 and 14 provided along the edges of the film. Wheel 15 and 16 are fast upon a shaft 17 driven by an electric motor 18 fed by mains 19. A pinion 20 is fast upon shaft 17 and drives through a chain 21 and a second pinion 22, a shaft 23 of the wind-up reel 12.

The apparatus comprises a radiating source 24 the radiations of which are directed by a light concentrating optical device 25—26 toward one or more movable mirrors 27, 28 and 29, respectively, the positions of which are controlled by the quantities to be measured or recorded. The three beams of radiation 30, 31 and 32 reflected by said mirrors impinge upon the photo-conductive receiver 10. Somewhat posterior, with respect to the motion of the said receiver, two electrodes 33 and 34 oriented transversely to the said motion are provided between which an electric potential difference is produced by connecting the electrodes with suitable poles of a source of current through wires 40 and 41.

Under the influence of the radiations effected by said beams 30, 31 and 32 transformations are produced in the receiver material at the points of impingement by said beams, the said transformations being fixed by means of the electric potential difference existing between electrodes 33 and 34. Curves such as 35, 36, 37 representing the registration or recording of the quantities controlling the motions of mirrors 27, 28, 29 are directly viewable after emerging from electrodes 33 and 34. As will be apparent a certain interval of time is required for an impinged area of the receiver 10 to reach the electrodes.

According to an alternative embodiment of the method, the whole surface of the receiver is irradiated with a suitable light, prior to the action of one or more movable electrodes the motions of which depend upon the phenomena to be recorded or registered and which being at a suitable potential cause a "development" only at the points of the receiving material with which they co-operate.

Another alternative embodiment of the method consists in irradiating the phosphorescent surface at a point where the registration is to take place with a narrow beam of light having the property of fading out phosphorescence; for example an infra-red light beam produced by means of a "Manganal" filtering glass or any other suitable device, the registered tracings being then visible in darkness.

Another alternative embodiment consists in substituting for the light beams of the preceding example, a cathodic radiation obtained, e. g., by passing an electron beam through a long and narrow aluminium gate having a thickness of a few micromillimeters, provided in the screen of a cathode-ray tube and against which moves the recording sheet coated with the semi-conducting receiver.

The photo-conducting receiver according to the invention is constituted by a body of which the electric conductibility depends upon the radiations it has received and which will be sometimes called hereafter "photo-conductive body" and by a carrier.

According to one embodiment, the photo-conducting body constitutes a coating of the carrier.

According to an alternative embodiment the photo-conductive body is mixed with or incorporated in the carrier.

In many applications the photo-conductive body is used together with a body sensitive to the flow of electric current and which will be sometimes hereafter called "reactive product."

Moreover a binder is frequently added.

A colouring matter is also sometimes added.

Among the photo-conductive bodies, the invention contemplates the use of phosphorescent bodies, since, as well known, both physical phenomena are often bound up with one another.

Among the said phosphorescent bodies, there is used, according to the contemplated application, phosphorescent bodies having very long, long, short, or ultra-short re-emission time intervals.

The phosphorescent bodies having very long re-emission time intervals are resorted to in particular when the carrier moves very slowly. For this purpose the following bodies may be used, inter alia: the sulfides of calcium, strontium, zinc, cadmium, manganese, copper, sodium, magnesium, bismuth containing impurities which may be luminogen products, such as salts of the said metals, or bodies such as fluorescein (dihydroxy fluorane), methylene blue (methyl thionine chloride), eosin, etc. the said bodies being used in various combinations.

As phosphorescent bodies having a short re-emission time interval, the following may be mentioned: fluorine, apatite, calcite, aragonite, witherite, barytine, strontianite, kunzite (spodumene), kryolith, calcium tungstate, zinc phosphate, these bodies being used alone or in combination with the preceding one.

Phosphorescent bodies having an ultra-short re-emission time interval are used in particular when it is desired to operate in daylight; it is then only necessary to maintain in darkness the portion of the apparatus disposed between the exposure zone and the development zone. Such bodies are for example the following: salicylic acid, uranite, uranyl acetate, fluorescein, esculin, rhodamine, platinocyanides, uranyl oxide salts, calcium tungstate, willemite, miscellaneous tungstates (cadmium, lead), anthracene, phenanthrene, alone or in combination with impurities.

The following simple or complex bodies may be also used as photo conductive bodies: proustite, iodyrite, miargyrite, pyrargyrite, stephenite, polybasite, bismuthinite, cuprite, bournonite, molybdenite, galena, boulangerite, selenium, cuprous oxide, thallium oxysulfide, jamesonite, pearcoite, cuprous iodide, potassium chloride with excess of potassium.

Phosphorescent paints the phosphorescence of which is stimulated by a small amount of radio-active products may be used, e. g. zinc sulfide with copper luminogen in which a small amount of radiferous barium sulfate or meso-thorium or radio-thorum has been incorporated. In this case the phosphorescence-stimulating source is located within the sensitive layer instead of being outside.

Generally, the photo-conductive body or bodies are used in association with a radio-active product as defined above. The said products, sometimes in combination with a binding product, permits a more or less explosive disintegration of the material under the action of current, thus developing the registration or recording.

The reactive product may be such that it responds to the action of current by fusing, explosion, colour variation or changes in hue, variation of the particle orientation causing an optical anisotropy which may be observed as polarized light.

The sensitivity to current flow may result from Joule effect, and/or from electrolysis, or the like.

As reactive products, among thermo-sensitive bodies the colour of which varies by decomposition (dissociation, loss of water, ammonia, carbon dioxide, water vapour) the following may be mentioned: $CoBr_2$, $2C_6H_{12}N_4$, $10H_2O$; $Co(CNS)_2$, $2C_6H_{12}N_4$, $10H_2O$; $(Cr(NH_3)_6)_4$, $(P_2O_7)_3$, etc.

Thermo-sensitive bodies the colour of which varies upon a partial or whole fusion may be also mentioned, such as mineral salts, organic salts, pure organic bodies used alone or mixed with a small amount of a crystallized colouring matter the colouration of which appears in the blended product. The reactive products are selected according to their compatibility with the other products, their thermal sensitivity and their change in hue.

The binding product which is used to provide the suitable adhesiveness may be selected among natural products such as, for example, resinates, starches, caseins, natural gums or among synthetic products such as, for example, cellulose xanthogenate, thermo-plastic or thermo-setting resins.

When resorting to a colouring matter, the same may be added either while stirring the other bodies or by impregnation of the carrier.

The carrier may be formed by: a paper containing loads or impregnation products, a thin sheet metal, a fabric made of natural or synthetic fibres or a plastic material with a suitable load.

According to the contemplated application, the said carrier may be transparent or opaque, the transparency being in particular preferred when it is desired to effect subsequently copies of the registrations or to use the same registration for an analysis of harmonics.

The recording means according to the invention makes use of electrical actions which give rise to a phosforescence or luminescence or electro-luminescence phenomenon. It may be applied to the photographic-recording apparatus as well as to the apparatus for electric recording in dry condition. The said means permits, if required, as with the known apparatus, the recording by means of pens, pencils, inking tapes, inks or any etching device.

Figure 3:
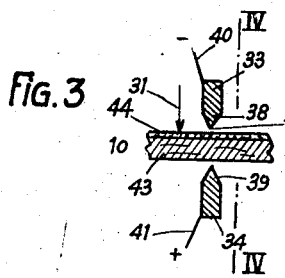
Fig. 3 is an enlarged sectional view of a part of the apparatus.
Figure 4:
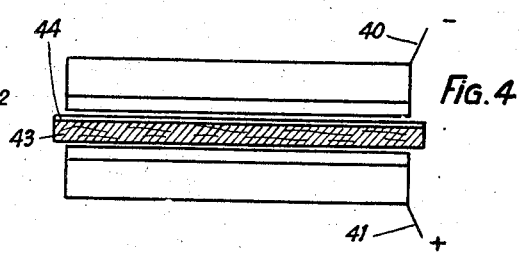
Fig. 4 is a sectional view taken on line IV—IV of Fig. 3.

In Figures 3 and 4, the photo-conducting receiver 10 comprises a conducting carrier 43, coated with a layer 44 containing the photo-conductive body as well as, when required, the reactive product and/or the binder. The receiver is acted upon by a light pencil or beam 31. Immediately posterior in the zone of impingement as seen in the direction of travel of receiver 10 are located on either side of the carrier, electrodes 33 and 34 having tapered edges 38 and 39. The said electrodes are brought to different potentials by means of conducting wires 40 and 41 connected to a suitable source. The spacing between the impact point of pencil 31 on the receiver and edge 42 of electrode 33 is selected according to the duration of the photo-conductivity.

There is produced, at the impact point of pencil 31, a variation of the conductibility of the photo-conducting body which makes layer 44 electrically conductive at this point. Through the gap between electrodes 33 and 34, passes therefore an electric current which flows transversely through carrier 43 and layer 44 at the point impinged by the radiation pencil. The said current causes in layer 44 vertically to the impact point, a transformation which makes the effect of the impingement immediately visible when it emerges from the gap without any chemical treatment.

According to the contemplated application, said beam or pencil may consist partly or wholly of day-light radiations or may be constituted by a special light such as Wood's light or by cathodic rays.

The potential difference which is maintained between electrodes 33 and 34 may be direct or alternative, according to the electrical phenomenon which is used for the development and according to the bodies and products constituting the layer.

Figure 5:
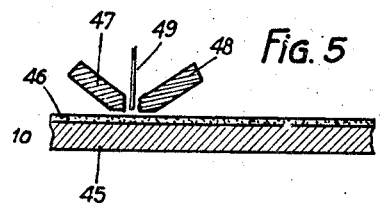
Fig. 5 is similar to Fig. 3, but it shows an alternative embodiment.

In an alternative embodiment shown in Fig. 5, the photo-conducting receiver comprises a carrier 45 made of an insulating material and coated with a sensitive layer 46; electrodes 47 and 48 which are brought to different potentials are disposed on the same side of the face of carrier 45 which supports the sensitive layer 46; the said electrodes are separated from one another by a screen 49. In this case, the current flows from one electrode to the other through layer 46 at the impact points of the pencil or pencils without transversing carrier 45.

Figure 6:
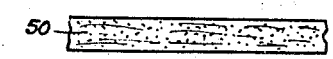
Fig. 6 is a sectional view of a recording material.

In the alternative embodiment shown in Fig. 6, the receiver is constituted by a carrier 50 in which the photo-conductive material is mixed or incorporated.

Two specific compositions of a photo-conducting receiver are given hereunder as illustrations.

*Example 1*

An opaque conductive carrier is constituted by a thin aluminium sheet which is coated with a thin uniform non-porous layer containing a mixture of cadmium sulfide at 20% and of zinc sulfide with a copper luminogen, said sulfide being phosphorescent and photo-conductive and the coating taking place after a suitable preparation of the surface by means of a solution of binding products containing, for example, 1% transparent Bakelite.

The same preparation may be also added with a reactive product constituted by

$Co(CNS)_2 2C_6H_{12}N_4 10H_2O$ producing a blue recording.

The overall load on the conducting carrier may reach 150 gr. per square meter of the surface.

A carbon or a metal-powder conducting paper or a semi-conducting paper may be substituted for the aluminium sheet, said paper being preferred due to its lower thermal diffusion and better stability.

*Example 2*

A thin soda-sulfate pulp paper is loaded at 60% with carbon bound by means of starch and then painted with an uniform and non-porous layer of zinc silicate with a manganese luminogen, the coating taking place before drying of the paper.

The term "photonic beam" as used in the claims appended hereto, designates a radiation or a beam of light, visible or invisible, which is capable of rendering electrically conductive the photo-conductive recording layer upon which it impinges.

Having now described and illustrated several preferred forms of my invention, I wish it to be understood that my invention is not to be limited to the specific forms or arrangements of parts herein described and shown, or specifically covered by my claims, except in so far as such limitations are specified in the appended claims:

I claim:

1. A device for recording a variable physical magnitude comprising in combination a photo-conductive recording layer, means moving the said layer uniformly as to time, means generating an electric field acting upon a zone of said layer transversely to the direction of movement of the layer, means generating a photonic beam and directing the same upon a zone of the said layer situated anteriorly in the direction of movement of the layer relative to the aforementioned zone of the electric field for rendering electrically conductive said zone of the layer, means moving said beam corresponding to changes in said physical magnitude, the intensity of said electric field being such as to produce in a zone of the layer rendered electrically conductive by the impingement of said beam a flow of current causing a visible tracing on the layer indicative of changes in the magnitude to be recorded.

2. A device for recording a variable physical magnitude in daylight comprising in combination a source of light, optical means concentrating the light of said source in form of a beam of light, means deflecting said beam of light corresponding to changes in said variable magnitude, a photo-conductive recording layer having a short re-emission time interposed in the path of said beam of light, drive means moving the said layer transversely to the general direction of said beam of light relative to said layer, means generating an electric field acting upon a zone of said layer transversely to the direction of movement thereof and posterior in the direction of movement to the zone of impingement by said beam, and means blocking the intrusion of light into the zone of the layer between said zone upon which the beam impinges and the said zone upon which the electric field acts.

3. A device for recording a variable physical magnitude in daylight comprising a photo-conductive recording layer, a source of light, optical means concentrating the light of said source in a beam of light impinging upon said layer, means displacing said layer, means deflecting said beam corresponding to changes in the magnitude to be recorded and in a zone on said layer situated transversely to the direction of displacement thereof, means generating an electric field in a narrow zone of said layer transversely to the direction of displacement thereof and situated posteriorly to the zone of impingement of said beam, and means blocking the intrusion of light into the zone of the layer situated between said zone upon which the beam impinges and said zone upon which the electric field acts.

4. A device for recording a variable physical magnitude in daylight comprising a source of light, optical means concentrating the light of said source in a beam of light, a recording layer including a photo-conductive material the electric conductivity of which continues for a predetermined short period of time in response to a phototonic action by the beam of light and which retains a visible tracing of the passage of an electric field, means moving the said layer uniformly as to time, means deflecting the said beam corresponding to changes in the magnitude to be recorded and causing the beam to impinge upon the layer so that the spot of impingement of the beam moves transversely to the direction of movement of the layer, means generating an electric field acting upon a narrow zone of said layer transversely to the direction of movement thereof and situated posteriorly (as seen in the direction of movement of said layer) to said spot produced by the beam, the speed of movement of said layer being such that the layer moves through the distance between the spot of impingement and the zone of the electric field in a period of time less than the period of time for which the said layer retains its electric conductivity, and means protecting the said intermediate zone against intrusion of daylight during the period of time in which the layer travels from said spot of impingement to said zone of action by the electric field.

5. A device for recording a variable physical magnitude comprising a photo-conductive and electrically sensitized recording layer, drive means moving the said layer uniformly as to time, means producing a photonic beam and directing the same upon said layer for rendering the same electrically conductive and producing a tracing thereon, means deflecting said beam corresponding to variations in the magnitude to be recorded and transversely to the direction of movement of said layer, two electrodes having a different electric potential disposed spaced apart closely adjacent to said layer and situated posteriorly (as seen in the direction of movement of the layer) to the area of impingement by said beam, the said difference in potential being such as to cause a flow of current between said electrodes traversing a zone of said layer passing between said electrodes and rendered electrically conductive by the impingement of said beam.

6. A device as described in claim 5, wherein the said electrodes are disposed on opposite sides of the layer.

7. A recording device as described in claim 5, wherein said electrodes are mounted in alignment on either side of the layer closely adjacent thereto so as to cause an electric flow through said material transversely to the direction of travel thereof.

8. A recording device as described in claim 5, wherein said electrodes are disposed spaced apart on the same side of the layer closely adjacent thereto so as to cause an electric flow through the electrodes and the adjacent portion of the layer.

References Cited in the file of this patent

UNITED STATES PATENTS

| Number | Name | Date |
|---|---|---|
| 2,221,776 | Carlson | Nov. 19, 1940 |
| 2,432,303 | Fox | Dec. 9, 1947 |
| 2,461,403 | Wilcox, Jr. | Feb. 8, 1949 |
| 2,501,790 | Silverman | Mar. 28, 1950 |

FOREIGN PATENTS

| Number | Country | Date |
|---|---|---|
| 188,030 | Great Britain | Oct. 23, 1922 |
| 375,639 | Great Britain | June 30, 1932 |
| 391,100 | Great Britain | Printed 1933 |